May 17, 1949.     M. P. WINTHER ET AL     2,470,596
TOROIDAL MAGNET FIELD FOR DYNAMOELECTRIC MACHINES
Filed May 5, 1948     4 Sheets-Sheet 1

Martin P. Winther,
Anthony Winther,
Inventors.
Haynes and Koenig,
Attorneys.

May 17, 1949.  M. P. WINTHER ET AL  2,470,596
TOROIDAL MAGNET FIELD FOR DYNAMOELECTRIC MACHINES
Filed May 5, 1948  4 Sheets-Sheet 3

Martin P. Winther,
Anthony Winther,
Inventors.
Haynes and Koenig,
Attorneys.

May 17, 1949.   M. P. WINTHER ET AL   2,470,596
TOROIDAL MAGNET FIELD FOR DYNAMOELECTRIC MACHINES
Filed May 5, 1948.   4 Sheets-Sheet 4

Martin P. Winther,
Anthony Winther,
Inventors.
Haynes and Koenig,
Attorneys.

Patented May 17, 1949

2,470,596

UNITED STATES PATENT OFFICE 2,470,596

TOROIDAL MAGNET FIELD FOR DYNAMO-ELECTRIC MACHINES

Martin P. Winther, Waukegan, Ill., and Anthony Winther, Kenosha, Wis., assignors to Martin P. Winther, as trustee Application May 5, 1948, Serial No. 25,246

15 Claims. (Cl. 171—252)

This invention relates to toroidal magnet fields for dynamoelectric machines, and with regard to certain more specific features, to improved magnetic poles for such fields, which are of the staggered-claw type. The invention is an improvement up on the construction shown in the United States patent application Serial No. 743,668, filed April 24, 1947, for Toothed pole rings for dynamoelectric machines, by Martin P. Winther, one of the applicants herein, issued as Patent 2,465,983, March 29, 1949.

Among the several objects of the invention may be noted the provision in a toroidal magnet field of the staggered-claw pole type in which homogeneously distributed flux of high density may efficiently be obtained from each pole face; the provision of a staggered-claw pole structure in which the shape of each pole is such that after leakage flux between poles has been taken into account, substantially normal sections through the S-shaped mean flux path through each pole will carry a substantially constant flux density without inefficient restrictions at any section; and the provision of a pole shape in which proper structural relationships are readily reproducible in any class of dynamoelectric apparatus employing claw-type poles in a toroidal field. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated.

Similar reference characters indicate corresponding parts throughout the several views of the drawings.

The present invention has particular application to electromagnetic eddy-current machines wherein (unlike in most motor and generator pole practice) an evenly distributed dense flux field emanating from a pole face is desired. Exemplary machines are eddy-current slip couplings, dynamometers, brakes, and the like. In some recent high-frequency motor and generator machines, the want has also been felt for such dense and evenly distributed flux fields. It should therefore be appreciated that the present invention has application to electromagnetic apparatsu in general wherein efficiently produced, evenly distributed high pole flux densities are desirable. The example given herein, for purposes of description, refers to an eddy-current slip coupling.

In U. S. Patent 1,977,600 (Reissue 20,225) is shown how improved efficient flux distribution from pole end areas may be obtained in the case of so-called salient poles wherein each pole carries a separate exciting winding. To obtain the corresponding ends in connection with electrical machines employing annular coils with the so-called staggered-claw type of poles has presented a constant problem in this art. Various attempts have been made to solve this problem with some progress; see, for example, U. S. Patent application of Martin P. Winther and Anthony Winther, Serial No. 616,122, filed September 13, 1945, for Dynamoelectric machine, issued as Patent 2,465,982, March 29, 1949; and the application of Martin P. Winther, Serial No. 743,668, filed April 24, 1947, for Toothed pole rings for dynamoelectric machines, issued as Patent 2,465,983, March 29, 1949. Further prior developments in this field are indicated in U. S. Patents 2,197,990, 2,367,163 and 2,367,636. By means of the present construction, optimum conditions have been obtained which improve the operation of staggered-claw poles and which are readily reproducible in any dynamoelectric machine requiring the effects of the improvement.

Figure 1:
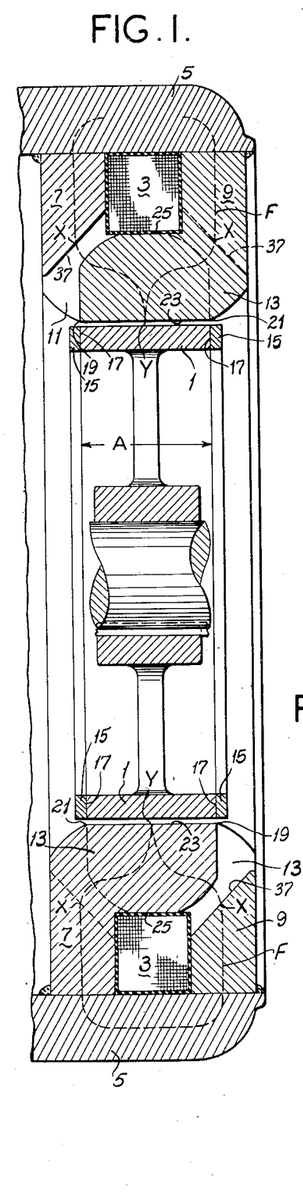
Fig. 1 is a longitudinal section through pertinent parts of apparatus embodying one form of the invention.

Referring now more particularly to Fig. 1, there is shown by way of example at numeral 1 a homogeneous magnetic iron inductor drum of an eddy-current machine. This may be the driving or driven member (if it is a slip coupling) and either the rotating or stator member (if it is a brake, dynamometer, motor or generator). At numeral 3 is shown an annular field coil in a cylindric homogeneous magnetic iron ring member 5. Fastened to the member 5 on opposite sides of the coil 3 are homogeneous magnetic iron rings 7 and 9, which are, respectively, formed with spaced magnetic claw-type teeth or poles 11 and 13. The respective teeth 11 and 13 are staggered, interdigitated, and point in opposite directions and envelop the coil 3. The claw-type teeth or poles form the subject of the invention. They may be referred to as being rooted in the rings. The non-root portions form extensions. While the coil 3 is shown as a magnetizing element, it is to be understood that other annular magnetizing elements may be used, such as, for example, a permanent annular magnet, to be described below in connection with Fig. 7.

The rings 7 and 9 (Fig. 1) are attached to the ring 5 as by welding or otherwise. The parts 3, 5, 7, 9, 11 and 13 all rotate as a unit assembly and may form the driving or driven field member if the device is a slip coupling; and either the rotating or stationary field member if the device is a brake or dynamometer; or the field of a motor or generator. Details of the rotary or other mountings for either of the relatively rotary assemblies thus far described are not included herein, since such form the known parts of apparatus to which the invention applies, as indicated, for example, by said patents and applications.

The rings 7 and 9 carry their respective pole teeth 11 and 13 in peripherally spaced relationship. The teeth extend oppositely, overlapping or interdigitating when peripherally considered around the coil 3. Thus the toroidal flux field which is generated by the coil 3 completes the circuit through the members 5, 7 and 11, thence into the inductor 1, then escaping adjacently from the inductor into the adjacent pole teeth 13 and completing the circuit through the ring 9 and back to member 5; or the sequence of the magnetic circuit may be reversed. The mean path of this flux field is indicated in cross section by dotted lines F in Figs. 1, 2 and 3. This path is S-shaped through each pole.

Figure 6:
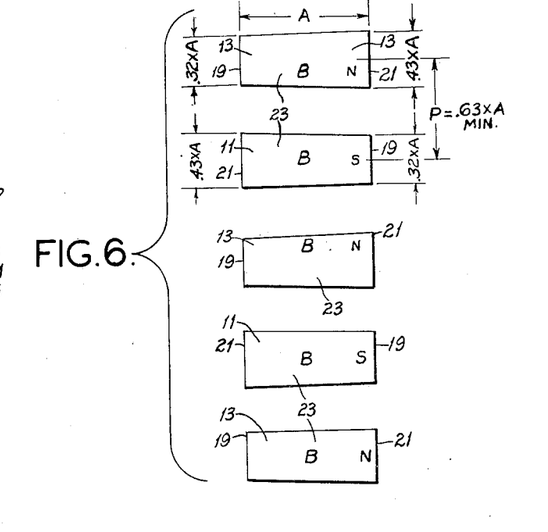
Fig. 6 is a developed plan view of several pole face areas properly pitched relatively to one another.

Each of one set of claw teeth, such as for example 13, assume one polarity (north, for example; Fig. 6) and each of the other set of poles 11 assume the opposite polarity (south, for example). The poles act as field distorters and flux concentrators so that as the flux field sweeps the inductor 1, due to relative motion, currents (eddy currents in the present case) are set up in the inductor whereby a magnetic reactive driving torque results, or in the case of a generator, current may be drawn off.

At numerals 15 are shown copper end rings brazed to the magnetic (iron) ring 1. The brazing connections 17 are substantially in the planes of the ends or toe lines 19 of the poles. These toe portions 19 track heel lines 21 of adjacent poles substantially in the planes of said highly conductive connections 17. The rings 15 favor the flow of eddy currents in regions where they are not generated opposite the faces 23 of the poles. But at the same time the rings do not displace magnetic material opposite said faces. Hence the flow of eddy currents in the drum 1 opposite the pole faces 23 is maximized.

Figures 2, 3:
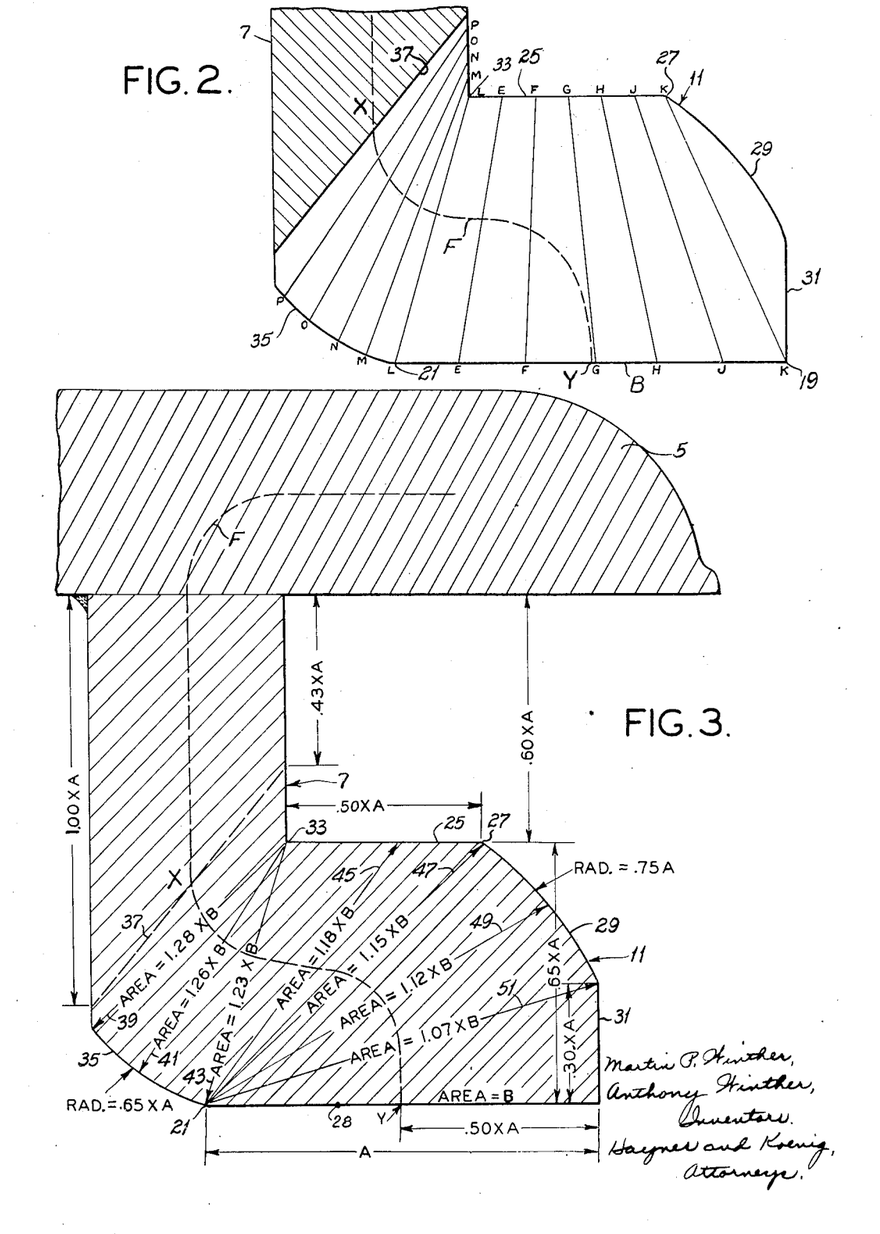
Fig. 2 is an enlarged ring section showing in side elevation a single claw-type pole, indicating in dotted lines the S-shaped form of a mean magnetic flux path and showing certain surface line elements.
Fig. 3 is an enlarged cross section of one pole showing certain optimum area relationships relative to said mean magnetic flux path.

As above stated and as shown in Figs. 1–3, the mean flux path in each pole is of S-shape extending from X through the heel part of the pole to a mid point Y on the face 23 of the pole. The physical reason for this S-shape is the claw or L-shape of the pole in which the flux is carried. The problem in the case of a claw pole of efficiently producing uniform flux from the pole face is therefore different from that in said Patent 1,977,600.

We have found that each successive area which is substantially normal to said S-shape X, Y, should carry substantially the same flux density (and evenly distributed) as the area of the pole face 23, and this should be true after leakage flux ahead of a given area has been accounted for.

We have, accordingly, produced a formulation of a claw-type pole which substantially accomplishes the end in view. Each pole has a substantially rectangular pole face 23, as shown in Fig. 6, except that there is a slight taper from the heel end 21 to the toe end 19. If the length of the pole face rectangle be indicated as A, then the heel for example is $.43 \times A$ and the toe width is for example $.32 \times A$. This provides a unit pole end area B of proper length to maximum width ratio of approximately 2.5 to 1. The minimum pitch P between adjacent poles is for example $.73 \times A$. This establishes the leakage gap between poles. Radial airgap clearance determines the pole pitch, as the leakage flux can be held to an optimum value with properly proportioned space between adjacent poles.

Considering the heel lines 21 of the poles, these are positioned to track the toe lines 19 of the adjacent poles. The tracking planes are near the inner attachments 17 of rings 15 in the inductor 1. These planes are well within the end planes of the magnetic rings 7 and 9.

Figure 4:
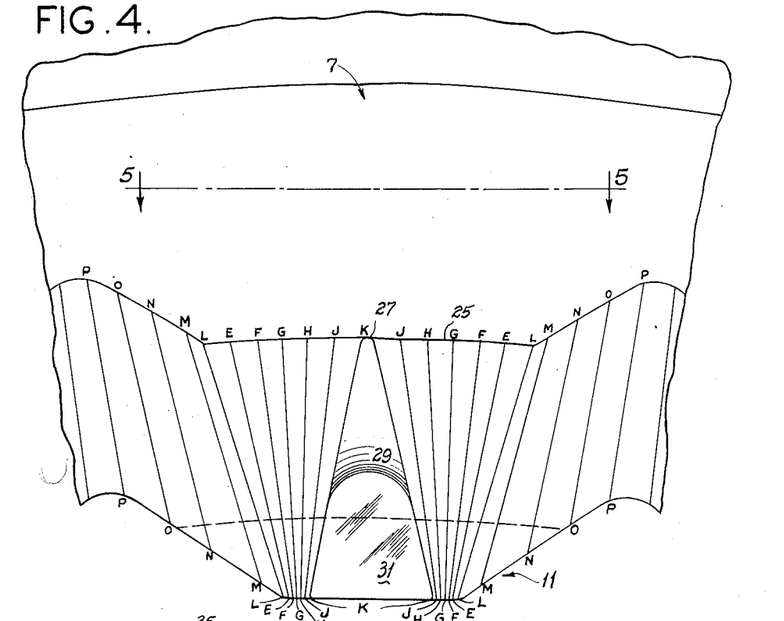
Fig. 4 is a right-end view of Figs. 2 and 3, showing said straight-line elements of Fig. 2.
Figure 5:
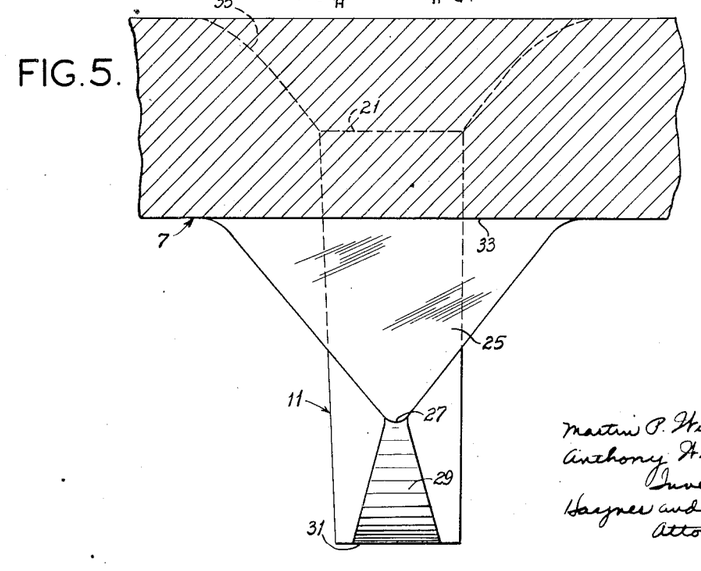
Fig. 5 is a cross section taken on line 5—5 of Fig. 4 and hence shows a bottom plan view of one pole.

Each pole has a substantially flat triangular bottom 25 (see the bottom plan view of Fig. 5), the plane of which bottom extends at right angles to the plane of the respective supporting ring 7 or 9. This triangle 25 is substantially right-angular and has an extension of approximately $.50 \times A$ (Fig. 3). From the apex 27 of triangle 25 an arc is struck centered at a point 28 in the pole face 23 between the ring end 21 of the pole face and its center, which establishes a non-radial or bevel surface 29 the radius of which is $.75A$. Surface 29 needs not to be exactly on said arc but should approximate it. The sides of this surface 29 flare out and up from 27 (Fig. 5). This flare may be eliminated, as will be shown. The outer end of each pole is formed as a flat radial face 31 flaring toward the inductor, the outer end of which is said line 19 (Fig. 4). The distance of face 31 from the mid plane of the magnetizing element 3 is for example $.50 \times A$ (Fig. 3). The triangular surface 25 meets the inner ring face at right angles at a base line 33. On 33 as a center trace, an arc of radius $.65 \times A$ is struck, determining a non-radial or bevel surface 35 from heel line 21 to the outer surface of the ring 7 or 9. Surface 35 needs not be exactly on said arc but may approximate it. Each surface 35 flares in from faces B towards its respective ring 7 or 9 (Fig. 5). Each pole as a whole is joined to the ring 7 or 9 at a valley angle of approximately 45°, as shown at 37.

If a plane be established normal to the paper in Fig. 3 and swung on line 33 as an axis (perpendicular to the paper), various sectional areas will be established which are labeled edgewise as 39, 41, 43. Area 39=1.28B; area 41=1.26×B; and area 43=1.23×B. Then if this plane be swung in the opposite clock direction around line 21 as an axis, areas 45, 47, 49 and 51 are successively established. Area 45=1.18×B; area 47=1.15×B; area 49=1.12×B; and area 51=1.07×B. Other areas between those enumerated have a similar intermediate progression, those enumerated being exemplary.

It will be understood that the sides of the pole are formed so that these areas 39—51 will have the relationship indicated. The symmetric geometric surfaces on each side of the pole are determined by pairs of straight generating side lines K, J, H, G, F, E, L, M, N, O, P. The outermost side lines K flare radially from one side of the coil 3 (Fig. 2) and toward the inductor (Fig. 4). Both of these flares are reduced as successive pairs of lines are considered from the pole end toward the central plane of the coil (note the angular progression of line pairs K—G). The flares finally reverse so that they become tapers toward the face of the pole (Fig. 4) and reverse radial flares (Fig. 2); note line pairs F—P. In other words, straight-line generators for the sides of the poles are adjusted in flare both radially (Fig. 2) and axially (Fig. 4) to provide the progressive area relationships in the sections 39—51 as above stated.

It will be noted that with the substantially rectangular pole ends having unit area B, that the sectional areas 51, 49, 47, 45, 43, 41 and 39 (Fig. 3) successively increase and that these areas are at angles relative to the S-shaped mean flux path X, Y which are as close to normal as is feasible to obtain within the structural conditions imposed by the necessary S-shaped pole form. In other words, the mean cross section of magnetic material carrying the S-shaped flux field is increased from the pole end area B to its root 37. The increase is such that after lost leakage of flux between poles has been accounted for up to a given area, the remainder of the flux left in the respective area has about the same density (number of lines per square inch) as the density in any other area. Furthermore this density is substantially evenly distributed over the area because the normal planes determining the areas turn as stated with the S-shaped mean flux path (Fig. 3).

Additional preferable relationships are that the cross section of the coil should be rectangular (preferably square) and about .60×A on the sides. Under such circumstances the inner end of the root line 37 should be .43×A from the outer rim of the coil. The outer end of root line 37 should be distance A from the outer rim of the coil. The radial distance from the inner triangular face 25 to the outer face area B should be .65×A, whereas the radial distance occupied by the face 31 should be .30×A.

The ultimate result is that the flux field remaining for emanation from pole end area B is equally distributed over said area B and may be pushed to saturation if need be throughout said area B, depending upon the excitation of coil 3. Whether saturated or not, the efficiency is high so that maximum effect is obtained with minimum coil excitation. It is to be understood that the coil 3 may be variably energized so that its ampere turns can be changed, thus changing the strength of the flux field. Consequently, the density from area B can be adjusted from zero up to saturation while at any value maintaining a substantially even distribution of that field from the pole end areas B. This factor is conducive to maximum magnetic coupling effect between the relatively rotary field and inductor members.

An advantage of the present form of claw pole over former ones is that the inner part adjacent the magnetizing element 3 is right-angular and flush fits the entire inner surface of a rectangular coil if the latter is the magnetizing element. Rectangular coils are commercially the best for producing toroidal fields. This flush relationship is not departed from until almost the entire inner face of the coil has been traversed by the pole extension (Fig. 1).

Figure 7:
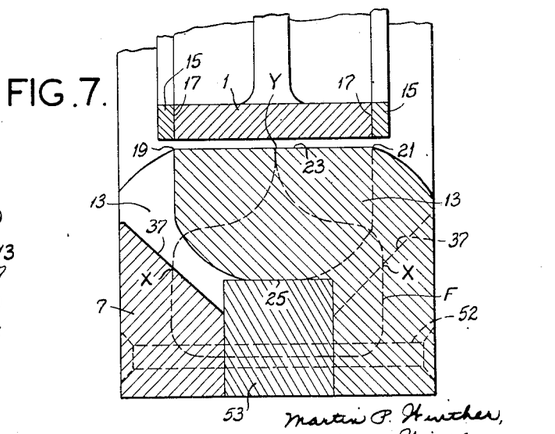
Fig. 7 is a fragmentary view similar to Fig. 1, showing an alternate form of a magnetizing element.

Instead of using an electromagnetic coil such as 3, a permanent magnet of the same shape may be used, but in this event the member 5 is not necessary for completing the flux circuit since the permanent magnet itself will do so between the rings 7 and 9. The rings 7 and 9 would then simply be bolted on opposite sides of such a permanent magnet ring. Such a construction is shown in Fig. 7, like numerals designating parts corresponding to those shown in Figs. 1–6, except that the permanent magnet 53 is substituted for the coil 3 and the fasteners are numbered 52.

Figure 8:
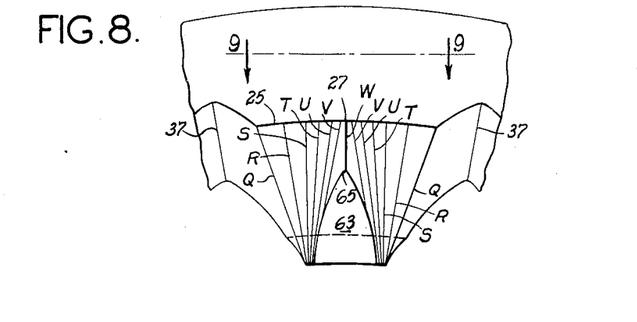
Fig. 8 is a view similar to Fig. 4 but showing another form of the invention on a different scale.
Figure 9:
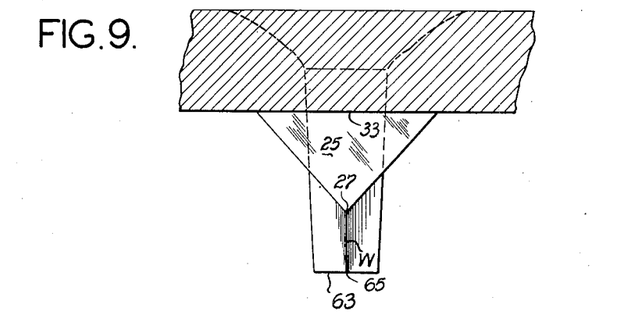
Fig. 9 is a view similar to Fig. 5 but showing said last-named form, being taken on line 9—9 of Fig. 8; and, Fig. 10 is a view similar to Fig. 2, but showing said last-named form.
Figure 10:
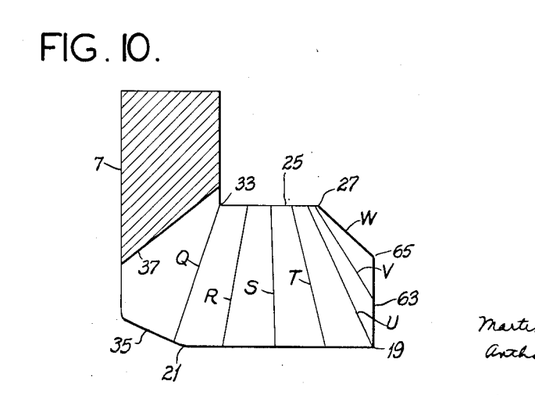

In Figs. 8, 9 and 10 is shown a construction embodying the invention in a slightly modified form. In this form, like numerals designate like parts where applicable. A point of difference is that the outwardly flaring bevel surface 29 of the first form of the invention is converted into a bevel line indicated at W. It should be observed in Fig. 8 that the substitution of lines W for surface 29 somewhat modifies the shape of surface 31 and the latter has been re-lettered as 63. The narrow portion of surface 63 becomes a point 65 which forms an apex. The character of the twisting straight generator lines is preserved in the form shown in Figs. 8-10 and these are shown by the letters Q, R, S, T, U, V, W. The bottom beveled edge of the tooth end forms the last line W in this case.

A feature relating to both forms of the invention should be observed; namely, that the side surfaces of the poles which face one another are at all points essentially equidistant as measured over the shortest distance between the surfaces. That is, a line drawn normal to the side of any pole from any point on said side will also be normal to the opposed surface of the adjacent pole at the closest point and all distances so measured are substantially equal. This is an important factor because the cross leakage of flux between poles is thus properly controlled for constant flux density in the cross sections 39, 41, 43, 45, 47, 49, 51 and B.

A point that should be noted in both forms is that the general slope of the bevel surface 29 (or of the bevel line W) is inverse to that of the slope of the line 37 forming the bottom of the valley of the opposite notch and at the said constant distance therefrom. Thus the angles of these elements are inverse and preferably at 45°.

The invention may be best understood by noting that there is assumed the existence of an S-shaped mean flux path associated with claw-type poles extending from pole rings used in connection with an annular field coil and an adjacent inductor. We then shape each pole with a substantially triangular face adjacent the coil, with all the triangular faces lying virtually in a cylindric form and a substantially rectangular face away from the coil and adjacent the inductor, with all the latter faces lying virtually in a cylindric form. The sides of each pole are then shaped to converge toward the inductor at the ring end and to converge away from the inductor at the extending end (Figs. 4 and 8). Also the planes of the converging sets of lines K—K, J—J, etc. diverge substantially from the central plane of the coil (Figs. 2 and 10). These convergences and divergences are such that sections through each pole substantially normal to the S-shaped mean flux path will all carry substantially a constant flux density, assuming a constant interface distance between poles. Also, the shapes produced by the convergences and divergences are inverse such that there will be a substantially constant normal distance between poles at all points upon their interfaces.

From the above it will be seen that broadly we provide a toroidal magnet field of the type having peripherally staggered and oppositely directed claw-type poles of alternating polarities, wherein substantially rectangular pole faces opposite the inductor are of axial dimension approximately several times their greatest circumferential dimension. The radial depth from each pole face to its part which is flush with the coil is preferably over ½ the axial length A of the magnetic gap between the face and the inductor. Considering each pole face as having unit area B, all of the cross sections through a pole substantially normal to the mean S-shaped magnetic path formed by the claw shape exceed the pole area by an amount such that after leakage is accounted for at each area, said area carries a flux density substantially equal to that of the face area B, said flux being substantially homogeneously distributed across the respective areas. Also a substantially uniform leakage gap is presented between poles, which does not exceed approximately ⅜ of the axial length of the pole face providing for constant leakage control at each point on the side face of each pole. It should be understood that this uniformity of gap exists throughout the entire facing areas of the adjacent poles down to their root lines 37. It may also be observed that the side surfaces of each pole are determined by lines of a twisting geometric nature adapted to provide the area relationships 39—51 and B, as stated.

Pole pitch, governing clearance between poles is based on air gap clearance and is substantially equal to the circumferential pole width plus 30 times the radial air gap clearance.

It will be understood that surfaces such as 25 and the pole faces 23 are essentially flat enough to establish the geometric relationships above specified, although they have some cylindric curvature. Flatness increases with an increase in radius of the machine.

It will be noted that the surfaces 29 and 31, which extend from the inner triangular surface 25 to the end of the rectangular outer pole face 23, flare from the former to the latter; also that the surface 35 joining the opposite end of the pole face with the outside of the respective ring also flares from the pole face to the ring.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A pole structure for a dynamoelectric machine having an inductor, an annular field coil of rectangular section, and magnetic pole rings enveloping the coil; comprising oppositely exteded interdigitated poles extending from said rings across the coil and having substantially rectangular pole faces opposite the inductor, the opposite ends of which faces track in planes within the planes of the rings, each ring having notches between its poles the bottoms of which diverge at approximately 45° from the sides of the coil, each pole being formed at a root portion between the notches by a shape converging toward the inductor and away from the adjacent notches and in its extension being formed by a radial portion converging away from the inductor, said extension having a substantially right-triangular face lying with its base near one side of the coil and its apex near the other side of the coil, a first non-radial portion extending from the apex of said triangular face to the end of the extension and flaring outward from the former to the latter, a second non-radial portion at said root portion and extending from the ring end of the pole face to the outside of the ring and flaring inward from the former to the latter, said second non-radial portion lying substantially upon an arc centered on said triangle base, and said first non-radial portion lying substantially upon an arc centered at a point between said ring end of the pole face and the center of the pole face.

2. A pole structure for a dynamoelectric machine having an inductor, an annular field coil of rectangular section, and magnetic pole rings enveloping the coil; comprising oppositely extended interdigitated poles extending from said rings across the coil and having substantially rectangular pole faces opposite the inductor, the opposite ends of which faces track in planes within the planes of the rings, each ring having notches between its poles the bottoms of which diverge at approximately 45° from the sides of the coil, each pole being formed at a root portion between the notches by a shape converging toward the inductor and away from the adjacent notches and in its extension being formed by a radial portion converging away from the inductor, said extension having a substantially right-triangular face lying with its base near one side of the coil and its apex near the other side of the coil, a first non-radial portion extending from the apex of said triangular face to the end of the extension and flaring outward from the former to the latter, a second non-radial portion at said root portion and extending from the ring end of the pole face to the outside of the ring and flaring inward from the former to the latter, said second non-radial portion lying substantially upon an arc centered on said triangle base, and said first non-radial portion lying substantially upon an arc centered at a point between said ring end of the pole face and the center of the pole face, the radial dimensions of said arcs being such that successive areas through the pole taken substantially normal to the mean flux path therethrough will carry amounts of flux densities substantially equal to that emanating from the pole face.

3. In a dynamoelectric machine an annular magnetizing element of rectangular cross section, a cylindric inductor spaced from said magnetizing element, magnetic rings adjacent to said magnetizing element having notches with valleys arranged at an angle with respect to the sides of the magnetizing element, interdigitated pole extensions from said rings between the valleys having triangular faces lying against said magnetizing element and having substantially rectangular faces lying adjacent the inductor, said interdigitated extensions providing S-shaped mean magnetic flux paths between the rings and the inductor, the outer ends of said extensions comprising end faces and beveled portions extending to the magnetizing element, said beveled portions lying at a substantially constant distance from said valleys, beveled portions joining the opposite ends of said extensions with the outsides of the magnetic rings, the opposed side faces of the poles being shaped to provide for a substantially constant flux leakage distance along common substantially normal lines to the surfaces and to provide for cross sections substantially normal to said S-shaped mean flux paths which carry substantially a constant flux density.

4. Apparatus made according to claim 3 in which said end faces lie approximately in the mid planes of the magnetic rings.

5. In apparatus of the class described, an annular magnetizing element, a cylindric inductor, magnetic rings adjacent said element having notches therein, interdigitated pole extensions from said rings and extending across the magnetizing element and providing for S-shaped mean flux paths, each extension having a substantially right-triangular face adjacent said element and having a substantially rectangular opposite pole face adjacent the inductor, the ends of said extensions being of substantially triangular forms whose bases form pole face end lines, adjacent poles having heel lines tracking said end lines, said end and heel lines lying in the planes of said rings, beveled portions reaching from the heel lines to the outsides of said rings, bevel lines extending between the apex of each right-triangular face and the apex of the respective triangular end face, the sides of the extensions and forms of said notches being such as to maintain a substantially constant flux gap throughout the faces and to provide cross sections substantially normal to said S-shaped mean flux paths respectively which increase from the respective rectangular faces to carry a substantial flux density.

6. In a dynamoelectric machine an annular magnetizing element of rectangular cross section, a cylindric inductor spaced from said magnetizing element, magnetic rings adjacent to said magnetizing element having notches, interdigitated pole extensions from said rings between the valleys having right-triangular faces adjacent said element and having a substantially rectangular opposite pole face adjacent the inductor, the ends of said extensions being of substantially triangular forms whose bases form pole face end lines, adjacent poles having heel lines tracking said end lines, said end and heel lines lying in the planes of said rings, beveled portions reaching from the heel lines to the outsides of said rings, bevel lines extending between the apex of each right-triangular face and the apex of the respective triangular end face, the sides of the extensions being formed by straight-line generators starting with said bevel lines, successive pairs of the generator lines on opposite sides of the extension flaring away from the magnetizing element in the region of the end of the extension and flaring toward the magnetizing element in the heel regions of the extension.

7. A claw-type pole construction for relatively movable inductor and field members having a toroidal magnetizing element of right-angular cross section, comprising notched magnetic rings adjacent the sides of the magnetizing element, spaced oppositely directed interdigitated alternate north and south poles extending from between the notches in said rings and into the space between the magnetizing element and the inductor, each pole having a substantially tapering inner face extending substantially across and flush with respect to the magnetizing member and having a substantially rectangular outer face adjacent the inductor, a bevel portion extending from the small end of the flush face toward the outer end of the rectangular face, a bevel portion extending from the other end of the rectangular face toward the respective ring, and sides on each pole generated by pairs of straight lines the planes of which pairs flare from substantially the mid section of the magnetizing element, the members of each pair flaring toward the magnetizing element in the region of the respective ring and away from the magnetizing element in the end region of the pole.

8. A claw-type pole construction for relatively movable inductor and field members having a toroidal magnetizing element of right-angular cross section, comprising notched magnetic rings adjacent the sides of the magnetizing element, spaced oppositely directed interdigitated alternate claw-type north and south poles extending from between the notches in said rings and into the space between the magnetizing element and the inductor and containing S-shaped mean flux paths, each pole having a substantially triangular inner face extending flush with respect to the magnetizing member with a base line on one side thereof and an apex near the other side thereof, each pole also having a substantially rectangular outer face adjacent the inductor, a bevel portion extending from the apex of the flush face toward the outer end of the rectangular face, a bevel portion extending from the other end of the rectangular face toward the respective ring, and sides on each pole generated by pairs of straight lines the planes of which pairs flare from substantially the mid section of the magnetizing element, the members of each pair flaring toward the magnetizing element in the region of the respective ring and away from the magnetizing element in the end region of the pole, all flares being such that planes substantially normal to said S-shaped flux path increase in area starting at said outer face.

9. A pole structure made according to claim 8 in which adjacent opposed faces between poles are spaced at a substantially constant distance.

10. A dynamoelectric machine comprising coaxial and relatively rotatable field and inductor members, one surrounding the other, said field member comprising an annular magnetizing element, magnetic rings on opposite sides of the magnetizing element, each ring having an annular series of claw-type poles extending axially across the magnetizing element between the latter and the inductor, the poles extending from one ring being interdigitated with respect to and annularly spaced from the poles extending from the other ring, each ring having notches between its poles receiving the ends of the poles of the other ring, each pole having a pole face opposed to the inductor with the pole faces of all the poles lying virtually in a cylindric form, and a generally triangular face opposite its pole face opposed to the magnetizing element converging away from the respective ring with the triangular faces of all the poles lying virtually in a cylindric form, the base of each triangular face where it merges with its respective ring being substantially wider than the width of the pole face and the axial distance from said base to the apex of the triangular face opposite said base being less than the axial distance from the base to the end of the pole, the sides of each pole being formed as flaring surfaces convergent toward the pole face in the inner portion of the pole adjacent its junction with the ring and convergent away from the pole face in the outer end portion of the pole.

11. A dynamoelectric machine comprising coaxial and relatively rotatable field and inductor members, one surrounding the other, said field member comprising an annular magnetizing element of generally rectangular section, magnetic rings engaging opposite sides of the magnetizing element, each ring having an annular series of claw-type poles extending axially across the magnetizing element between the latter and the inductor, the poles extending from one ring being interdigitated with respect to and annularly spaced from the poles extending from the other ring, each ring having notches between its poles receiving the ends of the poles of the other ring, each pole being shaped to have a generally rectangular pole face opposed to the inductor with the pole faces of all the poles lying virtually in a cylindric form, and to have a generally triangular face opposite its pole face engaging the periphery of the magnetizing element and converging away from the respective ring with the triangular faces of all the poles lying virtually in a cylindric form, the base of each triangular face where it merges with its respective ring being substantially wider than the width of the pole face and the axial distance from said base to the apex of the triangular face opposite said base being less than the axial distance from the base to the end of the pole, the sides of each pole being formed as flaring surfaces convergent toward the pole face in the inner portion of the pole adjacent its junction with the ring and convergent away from the pole face in the outer end portion of the pole.

12. A dynamoelectric machine comprising coaxial and relatively rotatable field and inductor members, one surrounding the other, said field member comprising an annular magnetizing element of generally rectangular section, magnetic rings engaging opposite sides of the magnetizing element, each ring having an annular series of claw-type poles extending axially across the magnetizing element between the latter and the inductor, the poles extending from one ring being interdigitated with respect to and annularly spaced from the poles extending from the other ring, each ring having notches between its poles receiving the ends of the poles of the other ring, each pole being shaped to have a generally rectangular pole face opposed to the inductor with the pole faces of all the poles lying virtually in a cylindric form, and to have a generally triangular face opposite its pole face engaging the periphery of the magnetizing element and converging away from the respective ring with the triangular faces of all the poles lying virtually in a cylindric form, the base of each triangular face where it merges with its respective ring being substantially wider than the width of the pole face and the axial distance from said base to the apex of the triangular face opposite said base being less than the axial distance from the base to the end of the pole, the sides of each pole being formed as flaring surfaces convergent toward the pole face in the inner portion of the pole adjacent its junction with the ring and convergent away from the pole face in the outer end portion of the pole, each pole having a sloping portion extending from the apex of its triangular face to the end of the pole, and a sloping portion inclined from the inner end of its generally rectangular pole face in the direction away from the inductor and extending to the outside of the respective ring.

13. A dynamoelectric machine comprising coaxial and relatively rotatable field and inductor members, one surrounding the other, said field member comprising an annular magnetizing element of generally rectangular section, magnetic rings engaging opposite sides of the magnetizing element, each ring having an annular series of claw-type poles extending axially across the magnetizing element between the latter and the inductor, the poles extending from one ring being interdigitated with respect to and annularly spaced from the poles extending from the other ring, each ring having notches between its poles receiving the ends of the poles of the other ring, each pole being shaped to have a generally rectangular pole face opposed to the inductor with the pole faces of all the poles lying virtually in a cylindric form, and to have a generally triangular face opposite its pole face engaging the periphery of the magnetizing element and converging away from the respective ring with the triangular faces of all the poles lying virtually in a cylindric form, the base of each triangular face where it merges with its respective ring being substantially wider than the width of the pole face and the axial distance from said base to the apex of the triangular face opposite said base being less than the axial distance from the base to the end of the pole, the sides of each pole being formed as flaring surfaces convergent toward the pole face in the inner portion of the pole adjacent its junction with the ring and convergent away from the pole face in the outer end portion of the pole, each pole having a first sloping portion extending from the apex of its triangular face to the end of the pole, and a second sloping portion inclined from the inner end of its generally rectangular pole face in the direction away from the inductor and extending to the outside of the respective ring, the sides of the poles being so flared that normal distances between opposed side faces of adjacent poles are substantially equal.

14. A dynamoelectric machine as set forth in claim 13 wherein said sloping portions are so inclined and the said flaring surfaces are so flared that successive cross-sectional areas through the pole taken substantially normal to the mean flux path through the pole increase from the generally rectangular pole face toward the respective ring by amounts adapted to provide a substantially constant density of magnetic flux through each section and through the pole face.

15. A dynamoelectric machine as set forth in claim 13 wherein the first sloping portion lies substantially upon an arc centered at a point in the pole face between the end of the generally rectangular pole face adjacent the respective ring and the center of the pole face, and the second sloping portion lies substantially upon an arc centered at the said base of the generally triangular face of the pole, the radial dimensions of said arcs being such that the said twisted surfaces being so flared that successive cross-sectional areas through the pole taken substantially normal to the mean flux path through the pole increase from the generally rectangular pole face toward the respective ring by amounts adapted to provide a substantially constant density of magnetic flux through each section and through the pole face.

MARTIN P. WINTHER.
ANTHONY WINTHER.

REFERENCES CITED

The following references are of record in the file of this patent:

UNITED STATES PATENTS

| Number | Name | Date |
|---|---|---|
| 2,243,318 | Rawlings | May 27, 1941 |

OTHER REFERENCES

Alternating Current Machinery, Thompson, pages 116–117, published by Spon and Chamberlin, London, 1904.